May 23, 1933. N. T. HARRINGTON 1,910,916
PISTON RING
Filed Dec. 14, 1931   2 Sheets-Sheet 1
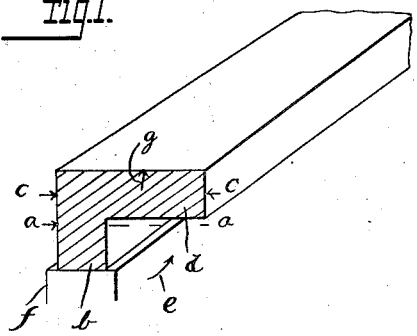
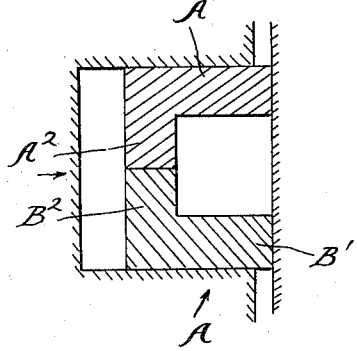
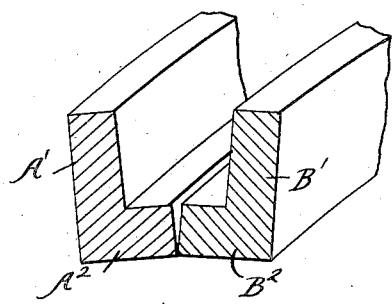
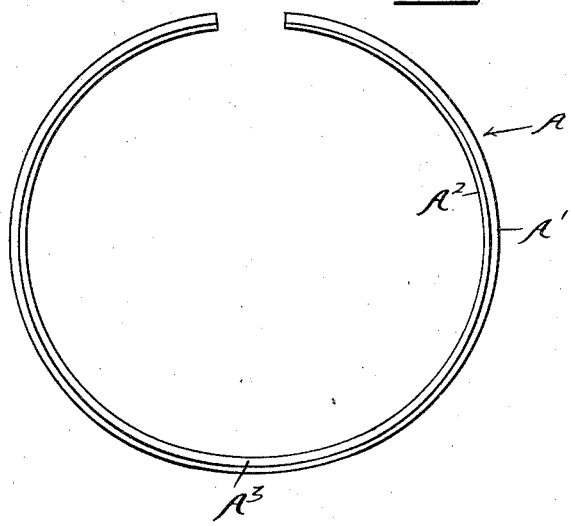
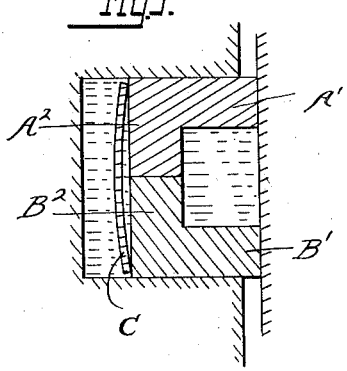
INVENTOR
Norman T. Harrington
BY Whittemore Hulbert
Whittemore + Belknap
ATTORNEYS May 23, 1933.   N. T. HARRINGTON   1,910,916
PISTON RING
Filed Dec. 14, 1931   2 Sheets-Sheet 2
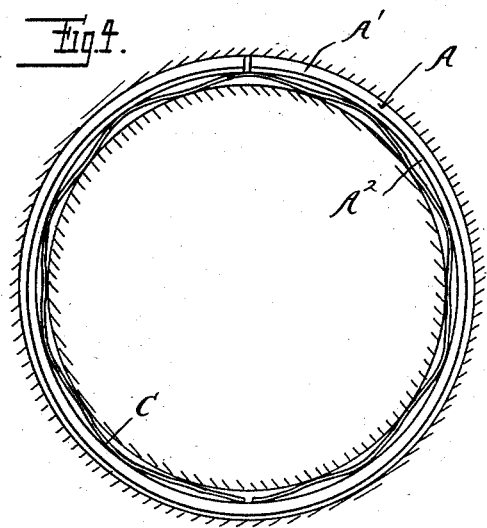
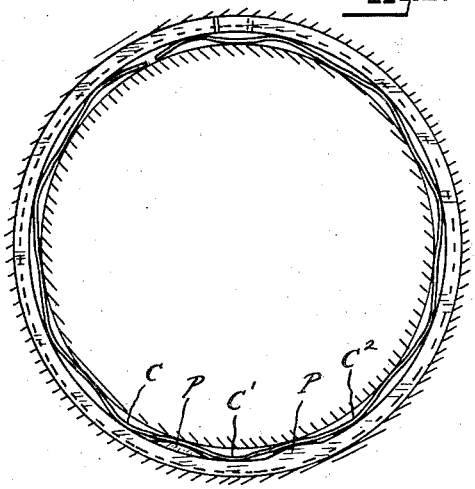
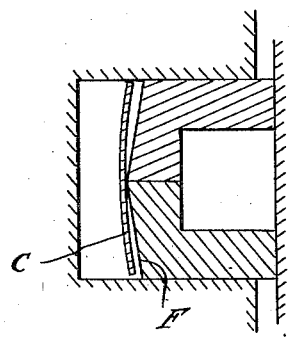
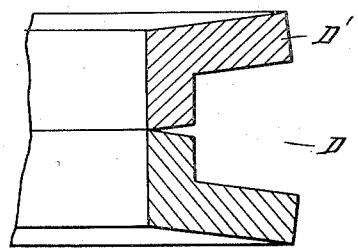
INVENTOR
Norman T. Harrington
BY Whittemore Hulbert
Whittemore & Belknap
ATTORNEYS Patented May 23, 1933

1,910,916

UNITED STATES PATENT OFFICE

NORMAN T. HARRINGTON, OF CLEVELAND, OHIO

PISTON RING

Application filed December 14, 1931. Serial No. 581,011.

The invention relates to piston rings and has for its object the obtaining of a simple construction which will effectively maintain a seal both peripherally against the cylinder wall and also with the sides of the ring groove. It is a further object to obtain a construction which will freely breathe, enlarging and contracting in diameter during operation to correspond to differences in cylinder diameter and will offer a minimum of frictional resistance to movement of the piston. With these objects in view the invention consists in the construction as hereinafter set forth.

In the drawings:

Figure 1 is a sectional perspective view illustrating the mechanical principles involved in my improved construction;

Figure 2 is a sectional view of a portion of my improved ring in engagement with the ring groove;

Figure 3 is a plan view of one of the ring members;

Figure 4 is a section in the plane of the ring groove showing a ring and an expander therein;

Figure 5 is a cross section of Figure 4;

Figure 6 is a cross section through a ring member of modified construction;

Figure 7 is a sectional perspective view of another modification;

Figure 8 is a section similar to Figure 4 showing a modified construction, and

Figure 9 is a cross section showing still another modification.

In the present state of the art various constructions of rings have been devised for maintaining a seal between the side of the ring and the wall of the ring groove as well as sealing between the periphery of the ring and the cylinder wall. In all of these it is necessary to develop pressure axially of the ring as well as radially thereof which is usually accomplished by separate means. It is also of the utmost importance that the axial pressure shall be so limited as not to interfere with the free radial movement necessary in the breathing of the ring when in operation. With my improved construction I provide means for developing a rotational stress within the cross section of the ring sufficient to maintain the desired axial pressure for sealing with the side of the ring groove but so limited as to permit free radial movement. I have also obtained a method of very accurately predetermining the ratio between radial and axial pressures and for so distributing these pressures that all contacting portions of the ring will produce an equally effective seal.

The mechanical principle involved in my improved construction may be illustrated as shown in Figure 1 which represents a bar of an angle cross section. In this line $a$—$a$ represents the neutral axis of the flange $b$ and the parallel line $c$—$c$ represents the neutral axis of a flange $d$. If opposing pressures are applied along these lines as indicated by the arrows, the result is a rotational stress tending to turn the bar in the direction of the arrow $e$. Thus if the end of the flange $b$ is resting against an abutment such as $f$, a force will be exerted to move the flange $c$ in the direction of the arrow $g$.

Making use of this mechanical principle I have designed a piston ring A which has a flange portion A' adjacent to the side wall of the ring groove and an angular flange portion $A^2$ which bears against an abutment such as a similar ring B reversed from right to left. If it is assumed that the rings A and B are of the usual transplit construction and so proportioned that when contracted radially to enter the cylinder they will be under a radially outward tension. Then it will be apparent that this outward tension in the direction of the arrow will cause the flanges A', B' to press against the sides of the ring groove, thereby producing a seal. In other words, the radial contraction of the ring incident to entering the same into the cylinder tends to distort the flanges A', B' into a flaring form as illustrated in Figure 7. The amount of this distortion or the rotational stress tending to distort is determined by the proportion of the flanges $A^2$ and $B^2$ relative to the flanges A' and B' and by proper selection of proportions any desired rotational pressure may be developed. If the ring were of a uniform cross section throughout its circumferential length there would be developed a rotational stress in all portions of this ring but not of uniform magnitude. Thus at the center or point diametrically opposing the split of the ring there would be developed the maximum rotational stress which would gradually diminish from this point to the ends on opposite sides of the split. For proper sealing, the pressure of the flanges A' B' against the side walls of the ring groove should be uniform throughout the circumferential length which I have accomplished in the following manner. Instead of forming the flanges A², B² of uniform thickness throughout the circumferential length of the ring, these flanges are of a tapering or diminishing cross section from the center opposite the split to the opposite ends. Thus as illustrated in Figure 3 the ring A has the outer face of its flange A² eccentric to the inner face thereof so that the point A³ diametrically opposite the split is of the greatest thickness and the ends adjacent to the split are of minimum thickness. As a consequence the rotational stress developed in the cross section of the ring as an incident to radial contraction thereof will be resisted at the point A³ to a much greater extent than at the points adjacent to the split with the result that the effective pressure of the flange A' against the side wall of the ring groove will be uniform throughout the circumferential length.

While it is possible to develop the radially outward pressure in the ring entirely through its own resiliency and by proportioning the cross section to obtain a predetermined rotational pressure for sealing with the walls of the ring groove, I find it desirable for many reasons to associate with the ring a reinforcing expander. This in addition to the known advantages of conforming the periphery of the ring to an out of round cylinder, has the further advantage that it simplifies the proportioning of the radial to the rotational pressures. Thus as shown in Figure 4 I reinforce the radially outward pressure of the ring by arranging a corrugated ribbon expander C between the inner face of the ring and the bottom of the ring groove. This expander is preferably of a width substantially equal to the width of the ring groove so that it will bear simultaneously against both of the flanges A² and B² of the rings A and B as shown in Figure 5. This will produce a circumferentially distributed radially outward pressure on both rings while the rotational stress incident to the radial contraction of the ring when introduced into the cylinder will produce the seal with the side walls of the ring groove.

My improved ring is one which is exceedingly simple to manufacture and which may be installed in pistons with great ease. The fact that the ring is in two separate parts permits of introducing these successively into the ring groove while the force required to expand the ring over the piston is less than half that required for a solid ring. The expander C may be introduced in the ring groove in advance of the ring sections A and B and will not interfere with the installation of the latter.

The fact that the rings A and B are of angle cross section reversed from right to left produces an annular groove in the ring which is sealed from communication with the ring groove by the abutment of the flanges A² and B² against each other. This channel, which is always filled with the lubricating oil, forms an effective means of maintaining the lubricant film upon the wall of the cylinder and at the same time the comparatively thin flanges A' B' limit the area of peripheral contact and correspondingly the radially outward pressure required for sealing. Another effect in having the sealed oil channel between the two ring sections is that it assists in holding the side flanges of these sections in uniform contact with the walls of the ring groove in addition to the pressure developed by the rotational stresses in said ring sections.

While I prefer to form the rings A and B with their flanges A' B' in planes perpendicular to the axis of the ring and to develop the rotational stress by radial contraction, it is possible to produce the side sealing in other ways. Thus as shown in an exaggerated way in Figure 6 the ring D is formed with its flange D' slightly flaring so as to be originally of greater width than the ring groove but when inserted in said groove to be forced into parallelism with the side wall thereof. With such a construction the ring may be inert as to radial expansion depending entirely upon the pressure of the expander to hold the same in peripheral contact with the cylinder, or in other words, the original diameter of the ring may be the same as that of the cylinder so that its inherent resiliency will not tend to cause any further radial expansion. Thus with such a construction the pressure against the side wall of the ring groove is still due to a rotational stress inherent in the cross section.

In the manufacture of expanders by the corrugation of a metallic ribbon one incident of the process is to slightly concave the outer surface of the cross section at the center of an outer corrugation. This as illustrated in Figure 5 will cause the expander to initially contact with the rings A and B at points adjacent to the side faces thereof. However, after the ring has been in operation for some time these contacting points will imbed themselves into the inner surface of the rings so as to obtain a full bearing across the expander. This feature is advantageous in that the initial contact of the expander with the rings has no tendency to increase the lateral pressure of the flanges A' B' against the side walls of the groove as might be the case if the expander were first to contact with the rings at the center of its cross section.

The radial contraction and expansion of piston rings in breathing sometimes has a tendency to cause the ring to rotate within the ring groove. This is undesirable as it prevents the ring from wearing into irregularities in the wall of the cylinder and consequently diminishes the effectiveness of the peripheral seal. To avoid such an effect I preferably provide my improved ring with a means for holding the ring sections from circumferential movement in the ring groove, this means being preferably a hump or radially inward projection on each ring section located between the outer crests of the corrugated expander. As shown in Figure 8 each ring section is provided with a hump P which is located at a point slightly offset from that diametrically opposite the split in the ring. If the ring sections are reversed in position, the placing of the humps P in registration with each other will slightly stagger the splits in the two ring sections to produce a break joint. The corrugated expander C is flexibly arranged with its split opposite the hump P while the outer crests of the corrugations C' C² on opposite sides of the hump will hold the latter from displacement. There is little tendency for the expander to move circumferentially in the ring groove and consequently it will hold the ring sections from such circumferential movement.

A further modification of my construction is shown in Figure 9 in which the inner periphery of the two ring members is chamfered as indicated at F so that the expander contacts with these sections adjacent to the meeting plane thereof. Thus the radial expansion of the expander will react upon the ring sections to develop the rotational stress therein necessary for sealing contact with the side walls of the groove. Such a construction may be used with dead rings which have no inherent rotational stress therein for effecting sealing.

What I claim as my invention is:

1. The combination with a member having a ring groove therein, of a trans-split ring within said groove having one face thereof adjacent to the side wall of the groove an abutment adjacent to an opposite face of said ring, and means for developing a rotational stress within the transverse cross section of said ring to maintain a sealing engagement with said side wall of the ring groove.

2. The combination with a member having a ring groove therein, of a trans-split ring within said groove, one face of said ring being adjacent to the side wall of the ring groove and abutment adjacent to an opposite face of said ring, and means for simultaneously developing a radially outward and a transverse rotational stress within said ring, said rotational stress being sufficient to maintain sealing contact with said side wall of the ring groove and being limited to permit free movement of the ring under said radially outward stress.

3. The combination with a cylinder and a member therein having a ring groove, of a radially expansible trans-split ring in said groove having a non-symmetrical cross-section with one side thereof adjacent to the side of the ring groove, and an abutment adjacent to the opposite side of said ring, one side of said ring being proportioned with respect to another side whereby said ring in conjunction with the radial expansive force and said abutment and cylinder wall will cause a rotational stress in the cross-section of the ring to cause the same to seal against the side of the groove.

4. The combination with a cylinder and a member therein having a ring groove, of a radially expansible trans-split ring in said groove having a non-symmetrical cross-section with one side thereof adjacent to one side of the ring groove, and an abutment adjacent to the opposite side of said ring, one side of said ring being proportioned with respect to another side whereby said ring when contracted into the groove in conjunction with the radial expansive force and said abutment and cylinder wall will cause a rotational stress in the cross-section of the ring to cause the same to seal against the side of the groove.

5. The combination with a cylinder and a member therein having a ring groove, of a radially expansible trans-split ring in said groove formed of two members abutting in the central plane of the groove, each of said members having a non-symmetrical cross-section with one side thereof adjacent to the side of the ring groove and one side thereof being proportioned with respect to another side whereby said members in conjunction with the radial expansive force, said abutments, and cylinder wall will cause a rotational stress in the cross-section of each member to cause the same to seal against its side of the groove.

6. The combination with a cylinder and a member therein having a ring groove, of a radially expansible trans-split ring in said groove formed of two members abutting in the central plane of the groove, each of said members having a non-symmetrical cross-section with one side thereof adjacent to the side of the ring groove, one side thereof being proportioned with respect to another side whereby said ring members in conjunction with the radial expansive force and said abutments and cylinder wall will cause a rotational stress in the cross-section of each member of the ring to cause the same to seal against its side of the groove, and means for developing radially outward tension in said ring sufficient to freely move the same against the resistance of the sealing pressure upon the side walls of the ring groove.

7. The combination with a cylinder and a member therein having a ring groove, of a radially expansible trans-split ring in said groove having a non-symmetrical cross-section with one side thereof adjacent to the side of the ring groove, and an abutment adjacent to the opposite side of said ring, one side of said ring being proportioned with respect to another side whereby said ring in conjunction with the radial expansive force and said abutment and cylinder wall will cause a rotational stress in the cross-section of the ring to cause the same to seal against the side of the groove, the cross-section of said ring being varied throughout the circumferential length of the ring to equalize the rotational stresses in all portions of the ring.

8. The combination with a cylinder and a member therein having a ring groove, of a radially expansible trans-split ring in said groove having a non-symmetrical cross-section with one side thereof adjacent to the side of the ring groove, and an abutment adjacent to the opposite side of said ring, one side of said ring being proportioned with respect to another side whereby said ring in conjunction with the radial expansive force and said abutment and cylinder wall will cause a rotational stress in the cross-section of the ring to cause the same to seal against the side of the groove, said cross-section of the ring being varied throughout the circumferential length of the ring from a maximum at a point diametrically opposite the split to a minimum adjacent to the split whereby the rotational stresses in all portions of the ring are substantially equalized.

9. The combination with a cylinder and a member therein having a ring groove, of a radially expansible trans-split ring in said groove formed of two members, each of an angle cross-section with one flange thereof adjacent to the side wall of the ring groove and the other flange extending axially adjacent to the inner periphery and abutting against the corresponding flange on the other member, and an expander for engaging both of said ring members to urge the same radially outward whereby said ring members in conjunction with the radial expansive force of the expander and said abutments and cylinder wall will cause a rotational stress in the cross-section of each member to cause the same to seal against its side of the groove.

10. The combination with a cylinder and a member therein having a ring groove, of a radially expansible trans-split ring in said groove, having a non-symmetrical cross-section with one side thereof adjacent to the side of the ring groove and an abutment adjacent to the opposite side of said ring, one side of said ring being proportioned with respect to another side whereby said ring in conjunction with the radial expansive force and said abutment and cylinder wall will cause a rotational stress in the cross-section of the ring to cause the same to seal against the side of the groove, said stress being limited to permit free movement of the ring under said radial expansive force.

11. The combination with a cylinder and a member therein having a ring groove, of a radially expansible trans-split ring in said groove formed of two members, each of angle cross-section with one flange thereof adjacent to the side of the ring groove and the other flange extending axially adjacent to the inner periphery and abutting against the corresponding flange of the other ring member, said side and axially extending flanges being proportioned with respect to each other whereby each ring member in conjunction with the radial expansive force and said abutments and cylinder wall will cause a rotational stress in the cross-section thereof to cause the same to seal against the side of the groove, a corrugated ribbon expander between said ring sections and bottom of the groove, and projections on said ring sections for interlocking with said corrugated expander intermediate the outer crest of the corrugations thereof.

In testimony whereof I affix my signature.

NORMAN T. HARRINGTON.